United States Patent
Todd et al.

(10) Patent No.: US 12,142,983 B2
(45) Date of Patent: Nov. 12, 2024

(54) HAIR CLIPPER PIVOT MOTOR DESIGNED FOR BATTERY POWER

(71) Applicant: WAHL CLIPPER CORPORATION, Sterling, IL (US)

(72) Inventors: David Joseph Todd, Polo, IL (US); Rafi Syed, Dixon, IL (US); Curtis James De Frang, Rock Falls, IL (US); Stephan Beha, Unterkirnach (DE); Dustin R. Taylor, Katy, TX (US); Jon Thomas Freas, Sterling, IL (US); Jason Kyle Everly, Rock Falls, IL (US); Daniel Adam Blumhoff, Rock Falls, IL (US); Matthew Usterbowski, Asheboro, NC (US); Sudhir Brahmandam, Naperville, IL (US); Matthew Jason Bowers, Dixon, IL (US); Scott Melton, Erie, IL (US); Drew Paul Mitchell, Polo, IL (US)

(73) Assignee: WAHL CLIPPER CORPORATION, Sterling, IL (US)

(*) Notice: Subject to any disclaimer, the term of this patent is extended or adjusted under 35 U.S.C. 154(b) by 468 days.

(21) Appl. No.: 17/357,535

(22) Filed: Jun. 24, 2021

(65) Prior Publication Data
US 2021/0408863 A1   Dec. 30, 2021

Related U.S. Application Data

(60) Provisional application No. 63/045,644, filed on Jun. 29, 2020.

(51) Int. Cl.
*B26B 19/06* (2006.01)
*B26B 19/28* (2006.01)
(Continued)

(52) U.S. Cl.
CPC .............. *H02K 3/524* (2013.01); *B26B 19/06* (2013.01); *B26B 19/282* (2013.01);
(Continued)

(58) Field of Classification Search
CPC ....... B26B 19/38; B26B 19/282; B26B 19/06; B26B 19/3873; B26B 19/388;
(Continued)

(56) References Cited

U.S. PATENT DOCUMENTS 3,283,192 A * 11/1966 Tolmie ................ B26B 19/3853
310/194
3,561,115 A    2/1971 Palm
(Continued)

FOREIGN PATENT DOCUMENTS

CA    1045802 A    1/1979
CA    1055684 A    6/1979
(Continued)

OTHER PUBLICATIONS

WO-9637347-A1, Translation (Year: 2023).*
(Continued)

*Primary Examiner* — Nhat Chieu Q Do
(74) *Attorney, Agent, or Firm* — Greer, Burns & Crain, Ltd

(57) ABSTRACT

A pivot motor for a hair clipper is provided, including a stator with a plurality of laminations, a bobbin located in operational relation to the stator and having a coil of wire wound around the bobbin, an armature being configured for driving a hair clipper moving blade at one end, and having at least one magnet at an opposite end, the armature having a pivot point, and the motor being configured for operation between 2.5 and 4.2 Volts.

15 Claims, 8 Drawing Sheets

(51) Int. Cl.
*B26B 19/38* (2006.01)
*H02K 3/52* (2006.01)
*H02K 7/14* (2006.01)
*H02K 11/00* (2016.01)
*H02K 11/22* (2016.01)
*H02K 33/02* (2006.01)
*H02P 25/032* (2016.01)

(52) U.S. Cl.
CPC ........... *B26B 19/388* (2013.01); *H02K 7/145* (2013.01); *H02K 11/0094* (2013.01); *H02K 11/22* (2016.01); *H02K 33/02* (2013.01); *H02P 25/032* (2016.02); *H02K 2203/12* (2013.01)

(58) Field of Classification Search
CPC .... H02K 33/16; H02K 33/02; H02K 11/0094; H02K 11/22; H02K 1/14; H02K 1/34; H02K 7/145; H02K 3/524; H02K 2203/12; H02P 25/032
USPC .............................................................. 83/56
See application file for complete search history.

(56) References Cited

U.S. PATENT DOCUMENTS

| | | | |
|---|---|---|---|
| 3,586,940 A | 6/1971 | Benirschke | |
| 3,812,389 A | 5/1974 | Bowerman | |
| 3,846,603 A | 11/1974 | Houser | |
| 4,160,177 A | 7/1979 | Ascoli | |
| 4,392,092 A * | 7/1983 | Gassner | H02K 33/10 318/128 |
| 5,632,087 A | 5/1997 | Motohashi et al. | |
| 5,787,587 A | 8/1998 | Wahl et al. | |
| 5,955,799 A | 9/1999 | Amaya et al. | |
| 6,163,092 A | 12/2000 | Soultanian | |
| 7,123,821 B1 * | 10/2006 | Hayden | H02K 25/00 388/837 |
| 7,239,053 B2 | 7/2007 | Brill | |
| 8,276,279 B2 | 10/2012 | Heckman et al. | |
| 10,137,582 B2 * | 11/2018 | Todd | H02K 33/16 |
| 2003/0094861 A1 | 5/2003 | Shimizu et al. | |
| 2003/0192186 A1 | 10/2003 | Brill | |
| 2004/0169480 A1 | 9/2004 | Ueda et al. | |
| 2005/0127856 A1 * | 6/2005 | Maslov | H02K 1/187 318/400.21 |
| 2006/0059696 A1 | 3/2006 | Derby et al. | |
| 2009/0093361 A1 | 4/2009 | Sakatani et al. | |
| 2009/0229967 A1 | 9/2009 | Sakatani | |
| 2013/0200823 A1 * | 8/2013 | Chan | B26B 19/284 310/36 |
| 2014/0182138 A1 | 7/2014 | Krenik | |
| 2015/0314462 A1 | 11/2015 | Roman | |
| 2018/0141224 A1 | 5/2018 | Todd | |
| 2018/0361601 A1 * | 12/2018 | Hu | H02K 33/16 |
| 2019/0299436 A1 | 10/2019 | Fuellgrabe et al. | |

FOREIGN PATENT DOCUMENTS

| | | | |
|---|---|---|---|
| CA | 1109657 A | 9/1981 | |
| EP | 860933 A2 * | 8/1998 | ........... B26B 19/282 |
| EP | 3324524 A1 * | 5/2018 | ............. B26B 19/06 |
| GB | 273231 A | 9/1927 | |
| GB | 273232 A | 4/1928 | |
| GB | 388416 A | 2/1933 | |
| GB | 469972 A | 8/1937 | |
| GB | 495378 A | 11/1938 | |
| GB | 501957 A | 3/1939 | |
| GB | 509917 A | 7/1939 | |
| GB | 650052 A | 2/1951 | |
| GB | 651083 A | 3/1951 | |
| GB | 671101 A | 4/1952 | |
| GB | 826249 A | 12/1959 | |
| GB | 868934 A | 5/1961 | |
| GB | 873918 A | 8/1961 | |
| GB | 982843 A | 2/1965 | |
| GB | 1079798 A | 8/1967 | |
| GB | 1255808 A | 12/1971 | |
| GB | 1575559 A | 9/1980 | |
| GB | 2043360 B | 10/1980 | |
| WO | WO-9637347 A1 * | 11/1996 | ............. B26B 19/04 |

OTHER PUBLICATIONS

International Search Report and Written Opinion received for PCT/US2021/039377, mailed Sep. 24, 2021.

Communication and Supplementary Search Report received in European Application No. 21834631.0, dated Jun. 26, 2024.

* cited by examiner

HAIR CLIPPER PIVOT MOTOR DESIGNED FOR BATTERY POWER

RELATED APPLICATION

The present application claims the benefit under 35 USC 119(e) of U.S. Provisional Application No. 63/045,644 filed Jun. 29, 2020, the entire contents of which are incorporated by reference herein.

BACKGROUND

The present invention relates generally to electric pivot motors, also referred to as vibrator motors, and more specifically to pivot motors used to power electric hair clippers and trimmers.

Pivot motors are widely used to power electric hair clippers, and suitable examples are disclosed in commonly-assigned U.S. Pat. Nos. 7,239,053; 8,276,279 and 10,137,582, all of which are incorporated by reference. Conventional pivot motors are used in hair clippers because they produce reciprocating motion that vibrates a cutting blade to cut hair. Such pivot motors have an armature with a drive arm on one end, a magnetic assembly on the opposite end, and a pivot between the drive arm and the magnetic assembly. A stator located adjacent the magnetic assembly produces magnetic flux that drives the armature back and forth, in turn oscillating a reciprocating blade to cut hair. Pivot motors are desirable for hair clippers because of the significant amounts of power which is relatively efficiently transmitted to the reciprocating blade due to the operation of the magnetic circuit and flux transfer of energy between the stator and the magnetic assembly.

Conventional electric clippers and trimmers (collectively referred to as clippers or hair clippers) powered by pivot motors are traditionally powered by line voltage supplied by a traditional appliance cord. There is a growing movement in the hair styling industry to cordless or battery-powered cutting equipment. However, to date, there has not been a satisfactory commercially-available battery-powered pivot motor for a hair clipper.

Another problem common to conventional hair clipper pivot motors is that current methods of affixing magnets to the flux bridge include glue and heat staking a post through the center of the magnet. There is a strong magnetic force holding the magnets to the flux bridge due to the fact that they are directly touching. However, when the motor is running, the corners of the magnets come very close to the laminations, and the force between the magnets and the laminations can cause the magnets to slide off the flux bridge. Once the magnets have slid far enough they can be pulled off the flux bridge by the magnetic force generated in the coil and directed by the laminations.

Accordingly, there is a need for a pivot motor that is suitable for being battery powered. Further, there is a need for an improved hair clipper which is designed to accommodate a battery-powered pivot motor. In addition, there is a need for an improved hair clipper pivot motor which addresses the problem of loosening magnets identified above.

SUMMARY

The above-listed needs are met or exceeded by the present hair clipper pivot motor designed for battery power. More specifically, the present hair clipper pivot motor is designed for operation in the range of 2.5 to 4.2 Volts, far lower than conventional hair clipper pivot motors powered by line voltage. Another feature of the present hair clipper pivot motor is a relatively axially shortened length, in the range of 23-27 millimeters, compared to the 40 mm axial length of conventional pivot motors. Compensating for the shorter length, the present motor uses a bobbin wound with relatively thicker gauge wire, preferably gauge 26 or thicker. The thicker gauge wire compensates for the shorter motor length in providing the needed cutting power.

Still another feature of the present hair clipper pivot motor is an improved pivot arm which not only accommodates the reciprocating magnets forming the flux bridge, the magnets are fully captured or encapsulated by the pivot arm except for one magnet surface. In a preferred embodiment, the magnets are integrally formed with the pivot arm. A related feature of the present hair clipper pivot motor is a redesigned pivot arm, with a pivot point that is moved closer to the reciprocating blades. As such, the arc of movement of the magnets is wider relative to conventional pivot motors, and provides more mechanical advantage over the reciprocating movement of the moving blade relative to the stationary blade. Accordingly, the present design uses less motive power to provide equivalent cutting power to the moving blade.

A further feature of the present motor is the use of a sensor for adjusting stroke of cutting blade movement. Conventional hair clipper pivot motors inherently maintain the cutting blade frequency by fixing that frequency to the driving frequency of the motor. Stroke of the pivot arm connected to the moving blade, however will decrease under loading conditions if not compensated for. In the present motor, the stroke is indirectly measured by the sensor through timing measurements and is accordingly compensated by increasing or decreasing the voltage seen at the coil through use of Pulse Width Modulation (PWM). The timing is translated to amplitude through the fact that for an object oscillating sinusoidally at a fixed frequency, the time it takes for that object to pass between two amplitude levels is inversely proportional to the overall amplitude of the movement. Accordingly, the present motor adjusts for higher load conditions, such as thicker or denser hair, by automatically increasing the applied voltage from the battery.

Also, an important parameter in electromagnetic motors is the air gap between magnetic materials as it has a major influence on the output power generated and the efficiency of the motor. In conventional hair clipper pivot motors, the magnets are attracted to the steel laminations. So, to maintain a consistent gap, many pivot motor designs use a secondary plate on the top side of the motor so that the pivot pin is held from the top and bottom.

More specifically, a pivot motor for a hair clipper is provided, including a stator with a plurality of laminations, a bobbin located in operational relation to the stator and having a coil of wire wound around the bobbin, an armature being configured for driving a hair clipper moving blade at one end, and having at least one magnet at an opposite end, the armature having a pivot point, and the motor being configured for operation between 2.5 and 4.2 Volts.

In an embodiment, the stator has an axial length in the range of 23-27 mm. In an embodiment, a rechargeable battery is electrically connected to the motor. In an embodiment, the armature is constructed and arranged so that the at least one magnet has a plurality of surfaces, and is encapsulated on all but one surface by the armature. In an embodiment, the pivot point of the armature is located closer to an end of the armature engaging the clipper moving blade than to an end accommodating the magnets. In a related embodiment, a ratio of a distance of the pivot point to an end of the armature accommodating the at least one magnet; to a distance from the pivot point to an end of the armature engaging the clipper moving blade is 2.1:1.

In a preferred embodiment, a sensor is constructed and arranged for measuring an operational stroke of the armature, and being electrically connected to a controller on the motor for adjusting motor voltage as a function of the sensed armature stroke using Pulse Width Modulation. In an embodiment, the sensor is an opto-sensor. In an embodiment, the controller is configured so that as the sensed armature stroke decreases, the motor voltage increases.

In an embodiment, a support plate is provided to which the stator is connected, the support plate also being the mounting point for the armature. In an embodiment, the stator is connected to the support plate by welding.

In another embodiment, a pivot motor for a hair clipper, is provided, including a stator with a plurality of laminations, a bobbin located in operational relation to the stator and having a coil of wire wound around the bobbin; an armature being configured for driving a hair clipper moving blade at one end, and having at least one magnet at an opposite end, the armature having a pivot point; and the stator has an axial length in the range of 23-27 mm. In an embodiment, the stator has a width in the range of 28-35 mm. In an embodiment, the bobbin is provided with a coil of 26 Gauge wire or larger diameter. In an embodiment, the coil includes 75 turns of wire.

In still another embodiment, a hair clipper having a pivot motor is provided, including a hair clipper housing; a hair clipper bladeset operatively associated with the housing and including a stationary blade and a moving blade configured for lateral reciprocation relative to the stationary blade, a pivot motor mounted in the hair clipper, including a stator with a plurality of laminations; a bobbin located in operational relation to the stator and having a coil of wire wound around the bobbin; an armature being configured for driving the moving blade at one end, and having at least one magnet at an opposite end, the armature having a pivot point; a sensor associated with the clipper housing and constructed and arranged for measuring an operational stroke of the armature, and being electrically connected to a controller on the motor for adjusting motor voltage as a function of the sensed armature stroke using Pulse Width Modulation.

In an embodiment, the sensor is an opto-sensor. In an embodiment, the controller is configured so that as the sensed armature stroke decreases, the motor voltage increases.

DETAILED DESCRIPTION

Figure 1:
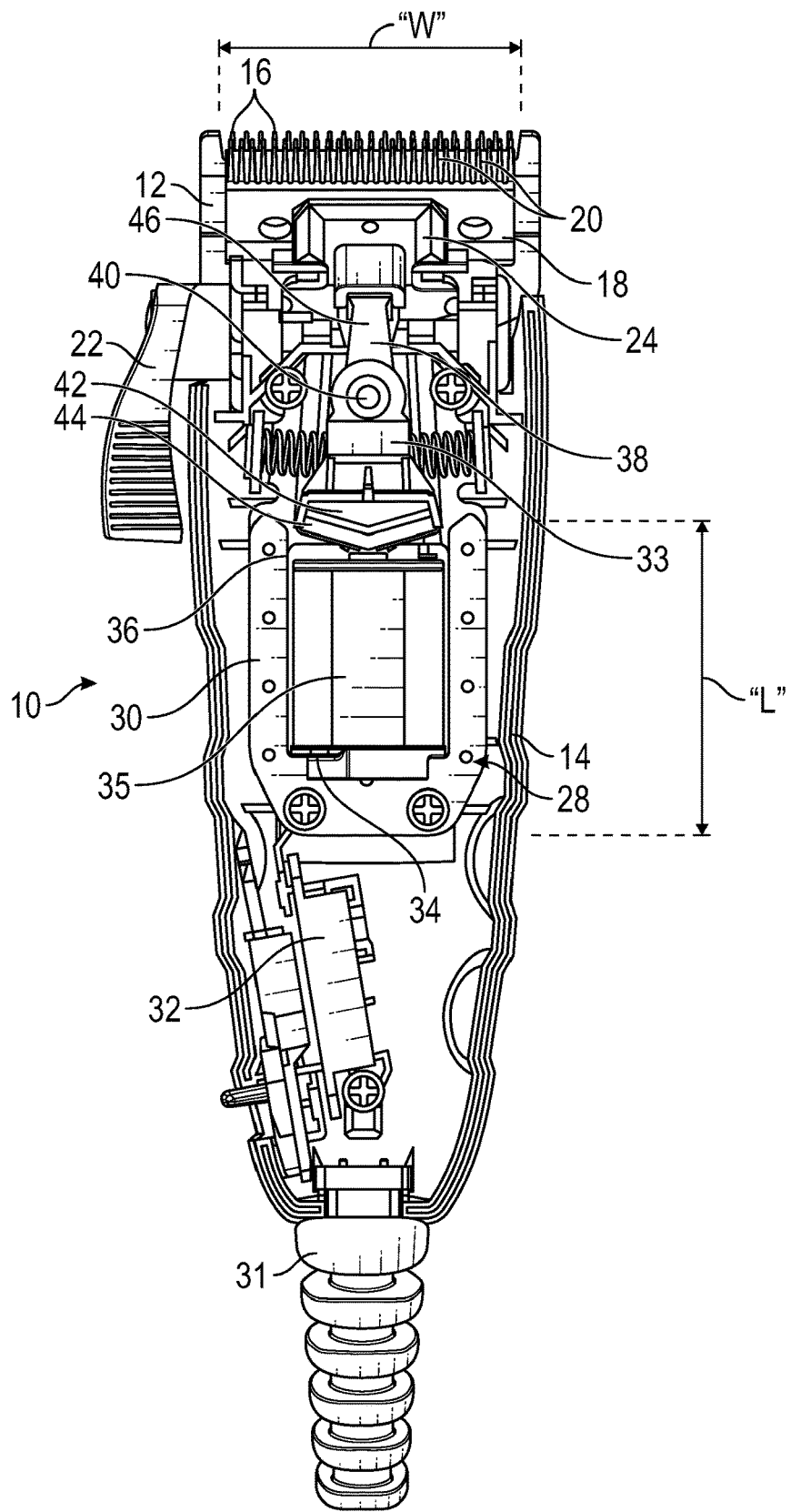
FIG. 1 is a fragmentary top view of a prior art hair clipper equipped with a pivot motor.

Referring now to FIG. 1, a prior art hair clipper 10 is shown having a stationary blade 12 operationally secured to a housing 14. The stationary blade 12 has a first row of cutting teeth 16. A laterally reciprocating or moving blade 18 is operatively secured against the stationary blade 12. The reciprocating blade 18 has a second row of cutting teeth 20 that complement the first row of cutting teeth 16. The distance between the tips of the first and second rows of cutting teeth can be set by and changed using an adjustment lever 22.

A driven element 24 is secured to the reciprocating blade 18. The reciprocating blade 18 is pressed against the stationary blade 12 by a spring (not shown) that allows the reciprocating blade to move back and forth, causing the cutting teeth to cut hair in operation. A pivot motor 28 is also secured in the housing 14. Included in the pivot motor 28 is a stator 30 including a stack of laminations forming a generally "E"-shape. The pivot motor 28 is powered by alternating current supplied through a power cord 31, a switch 32 and lead wires (not shown). A bobbin 34 with a coil 35 of wound wire is located in a space 36 defined by the stator.

An armature or pivot arm 38 has a pivot point 40, and is connected at an end 46 to the moving blade 18 and has at least one magnet 44 located at an opposite end 42. It will be seen that the stator 30 has an axial length "L" which is approximately 40 mm in length. A width "W" of the stator 30 is approximately 31 mm.

Figure 2:
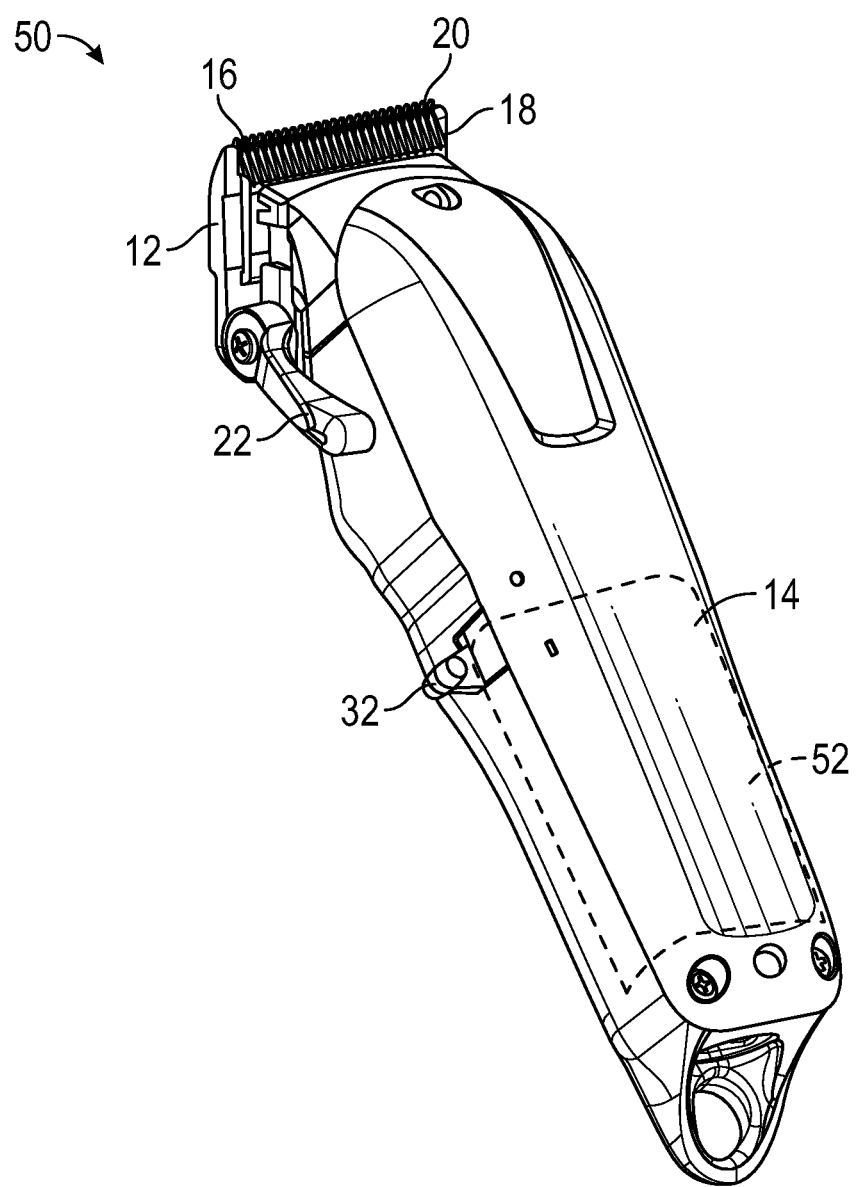
FIG. 2 is a top perspective view of a hair clipper suitable for use with the present pivot motor.
Figure 3:
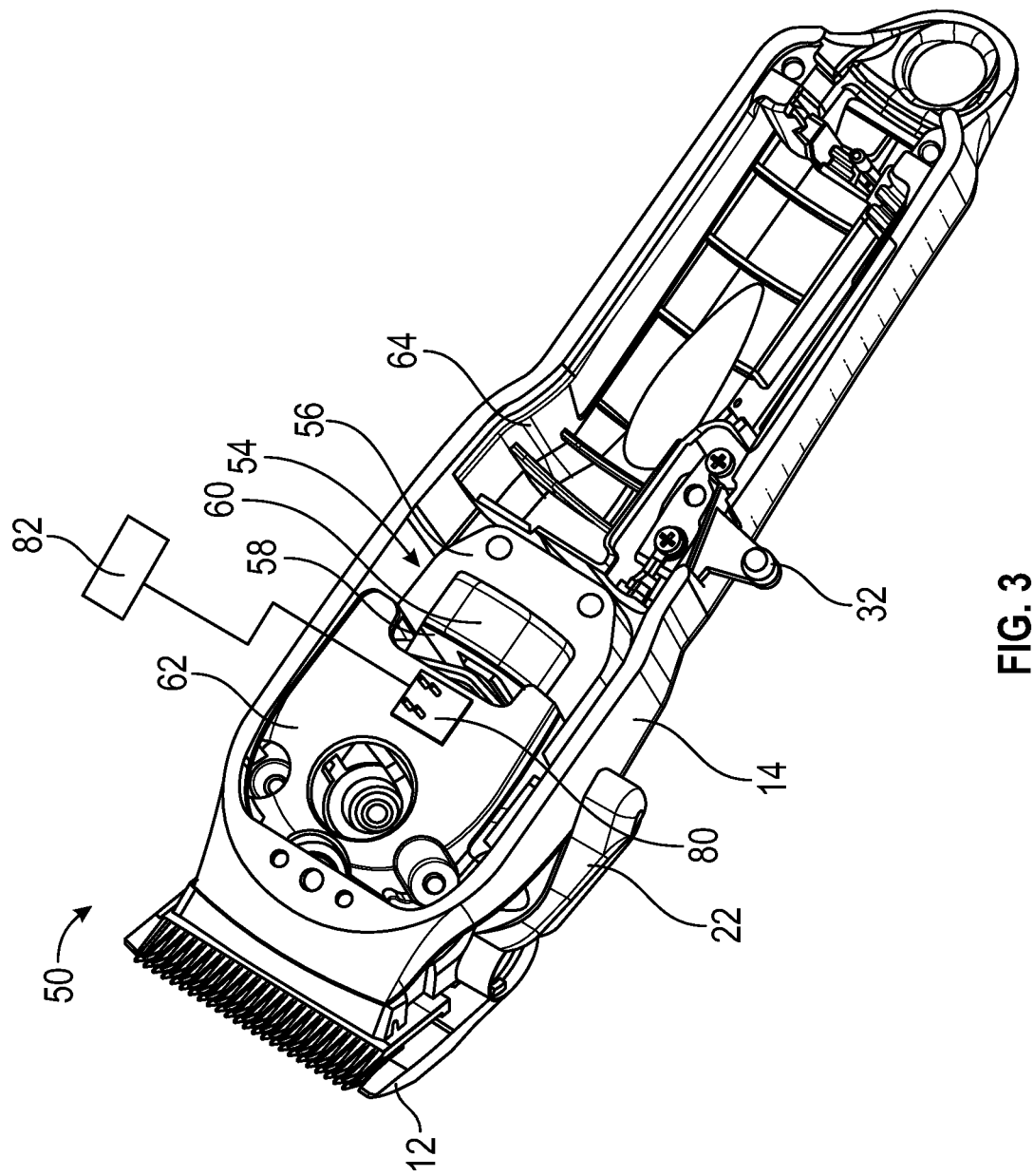
FIG. 3 is a fragmentary top perspective view of the hair clipper of FIG. 2 with portions removed for clarity.

Referring now to FIGS. 2 and 3, the present hair clipper is generally designated 50. Components shared with the hair clipper 10 are designated with identical reference numbers. A main difference between the clippers 10 and 50 is that the former is powered by conventional line voltage through the power cord 31, while the latter is battery powered, preferably with a rechargeable battery 52 (FIG. 2 shown hidden). Accordingly, the present pivot motor, generally designated 54 is designed for electrical connection to the battery 52 instead of being powered by traditional line voltage. An important feature of the present pivot motor 54 is that it is constructed and arranged to operate in a power range of 2.5-4.2 Volts, far lower than the clipper 10, which operates at 120 or 240 Volts and, in some cases, as low as 12 Volts. More preferably, the present pivot motor 54 is constructed and arranged to operate at 3.6 Volts.

While the present pivot motor 54 shares structural features with the pivot motor 28, it will be seen that a stator 56 including a plurality of laminations, and a bobbin 58 holding a coil of wire 60 wound about the bobbin are significantly shorter than their counterparts in the motor 28. A cover plate 62 is mounted within a cavity 64 of the clipper housing 14 for locating a sensor described in greater detail below.

Figure 4:
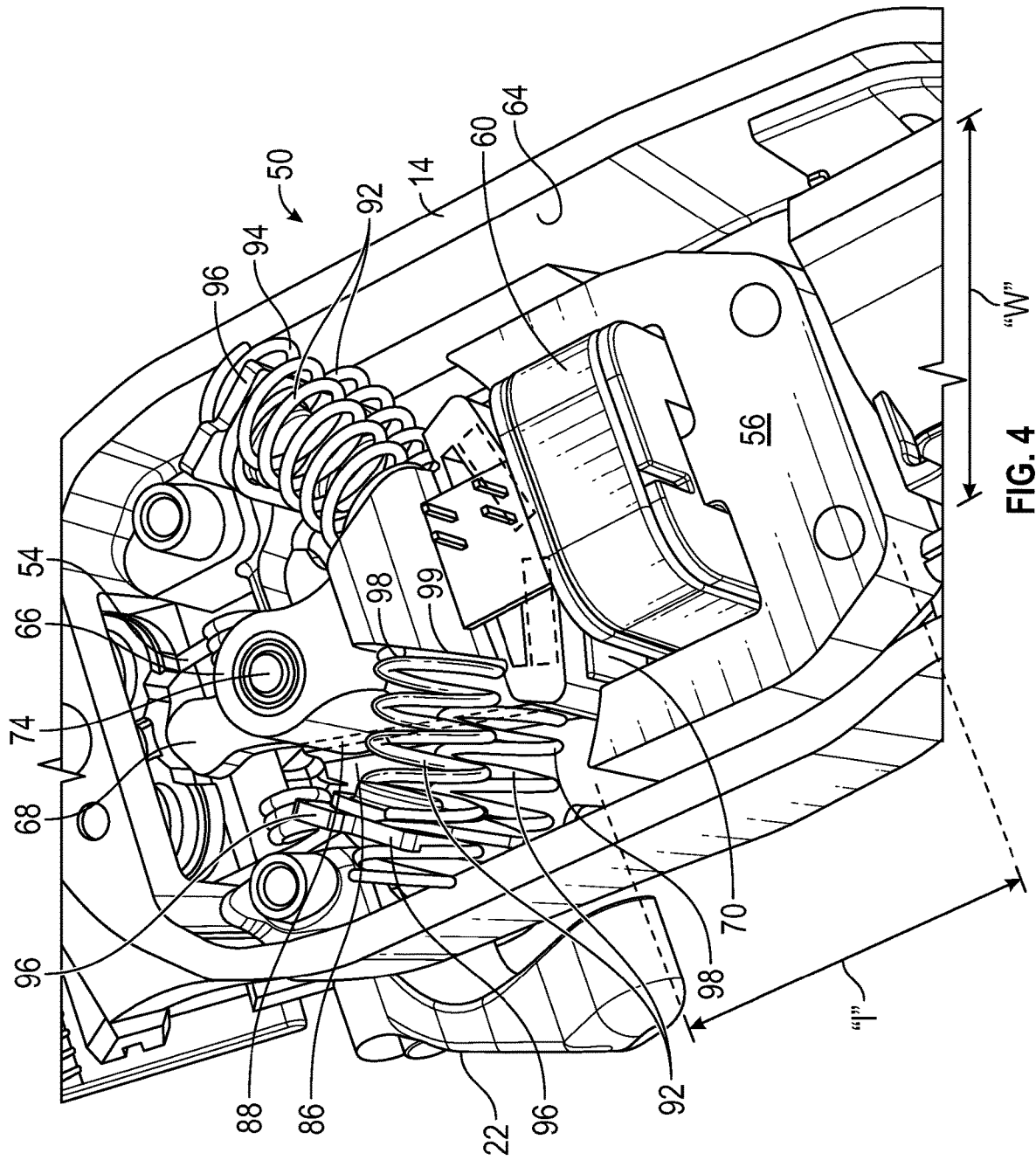
FIG. 4 is an enlarged, fragmentary perspective view of the hair clipper of FIG. 3 featuring the present pivot motor with further portions removed for clarity.
Figure 5:
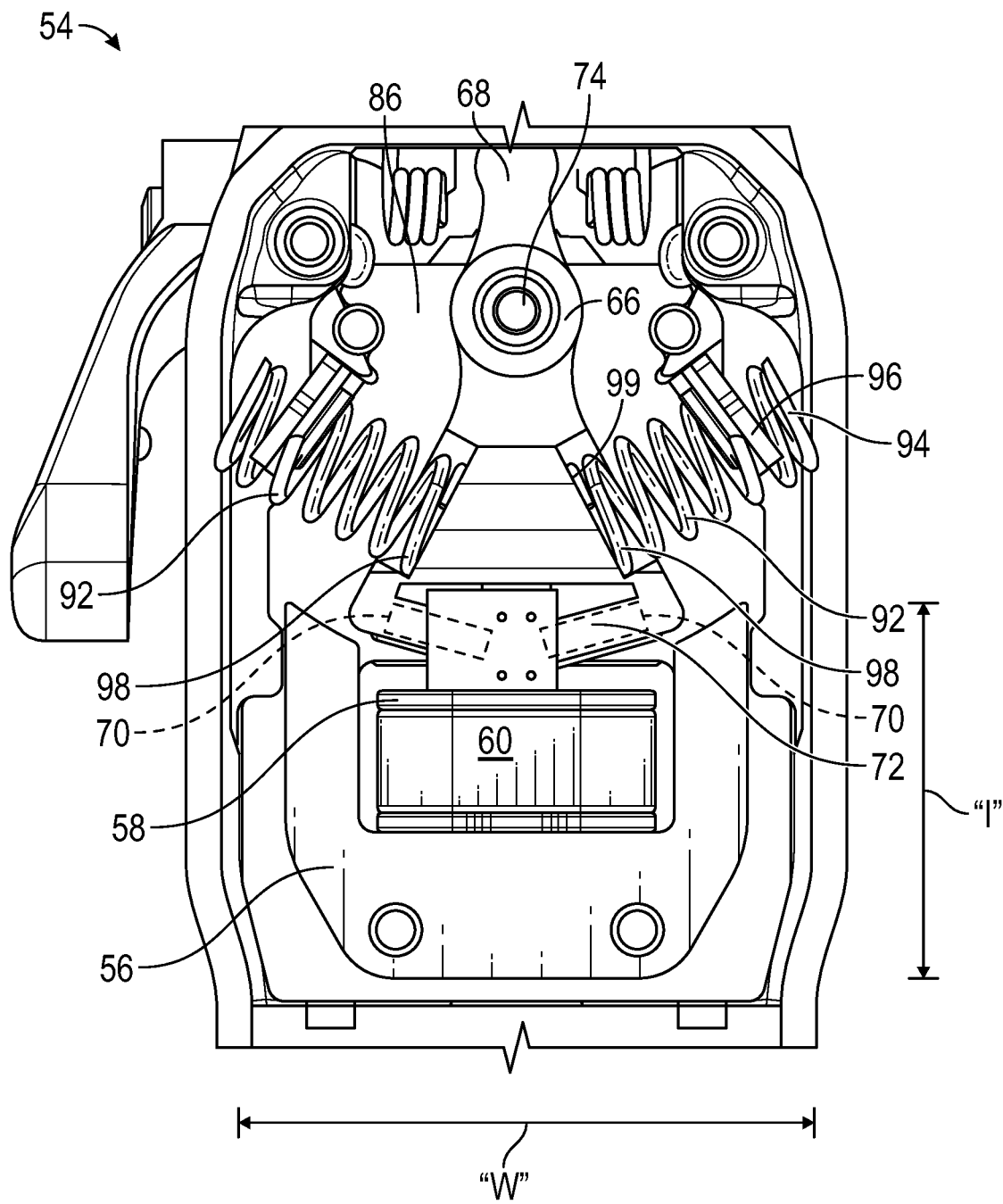
FIG. 5 is a top view of the present pivot motor.
Figure 6:
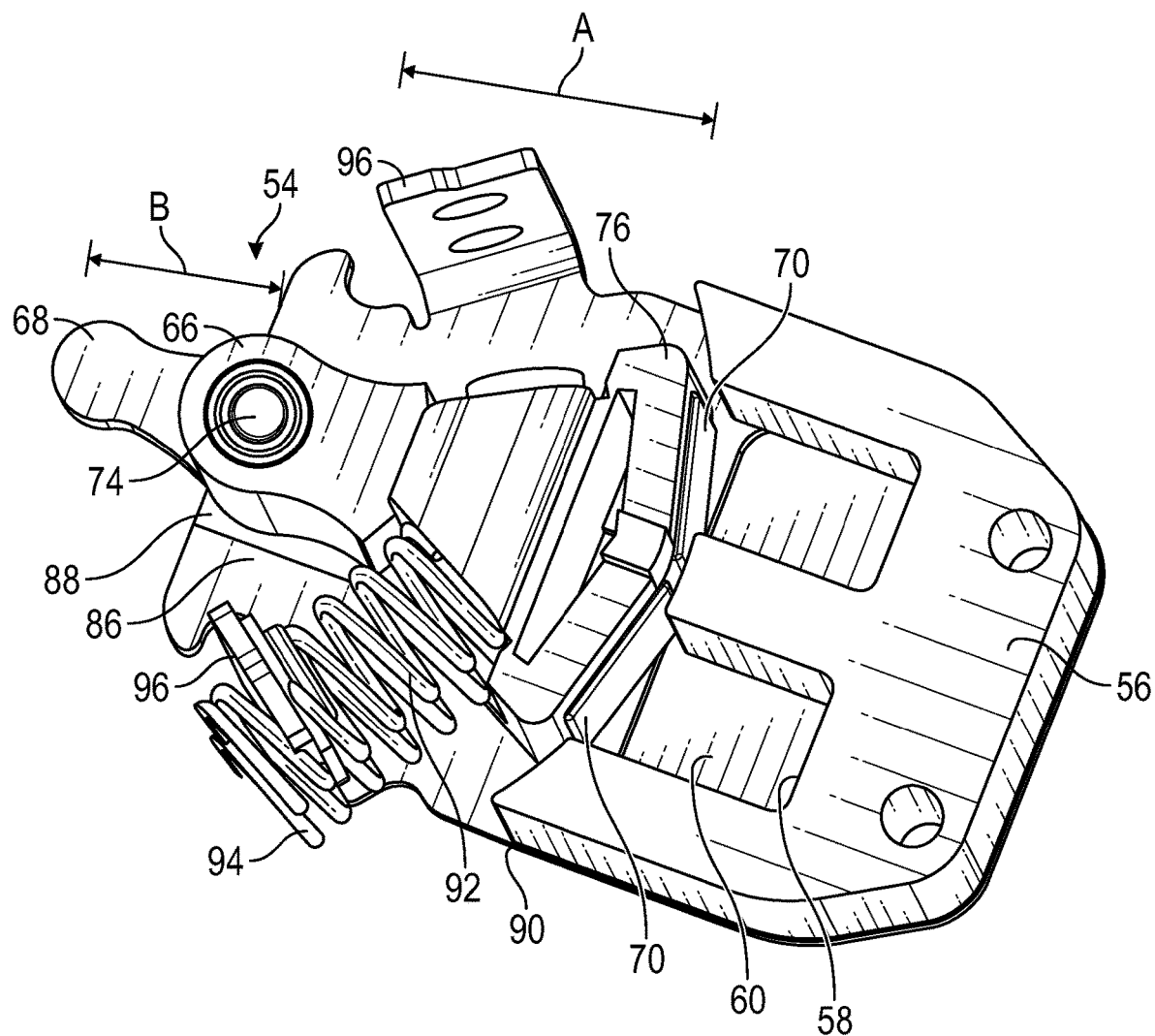
FIG. 6 is a fragmentary top perspective view of the present pivot motor.

Referring now to FIGS. 4-6, the present pivot motor 54 is shown in greater detail. Most significantly, the stator 56 has a length "l" of between 23-27 mm, and more preferably of 25 mm, which is far shorter than the stator 30 in the clipper 10. However, the width "W" of the stator 56 is approximately the same as that of the stator 30, in the range of 28-35 mm. This configuration is a departure from conventional thinking regarding the design of pivot motors, where it is generally held that longer and thinner motors are more efficient. The shorter profile of the present pivot motor 54 also creates more space for the battery 52 in the cavity 64.

Also, the coil 60 of wire that is wound about the bobbin 58 is a relatively thicker gauge than that used in the coil 35. In the pivot motor 54, the wire used with the bobbin 58 is preferably 26 Gauge or thicker, meaning a greater diameter. More preferably, the coil 60 is wound with 22 Gauge wire. Further, preferably, approximately 75 turns of such wire are wound around the bobbin 58, however other amounts of turns are contemplated, depending on the application. By using thicker gauge wire in the coil 60, the present pivot motor 54 compensates for its shorter length "l".

An armature 66 is significantly modified from the armature 38, however it is also configured for driving the hair clipper moving blade 18 at a first end 68, having at least one magnet 70 at an opposite end 72, and the armature has a pivot point 74. One new feature of the armature 66 is that each magnet 70 has a plurality of surfaces 76, and is generally rectangular and box-shaped (FIG. 6), and is encapsulated on all but one surface by the armature. This encapsulation of the magnets 70 has been found to successfully address the problem of magnets becoming dislodged from conventional armatures through extended use and exposure to the significant magnetic forces of the motor 28. In the armature 66, the magnets 70 are prevented from becoming dislodged.

Another feature of the armature 66 is the movement of the pivot point 74. In general, in the present pivot motor 54, the pivot point 74 is closer to the first end 68 engaging the moving blade 18 than to the end 72 accommodating the magnets 70. In contrast, in the conventional pivot motor 28, the pivot point 40 is approximately equidistant between the end 46 engaging the moving blade 18 and the end 42 accommodating the magnets 44. During operation of the pivot motor 54, the armature reciprocates from left to right as seen in FIGS. 4-6, and the limits of such lateral movement are referred to as the stroke of the motor. At the end 68, the stroke of the armature 66 needs to be sufficient to move the moving blade 18 laterally to the end of the stationary blade 12, as is known in the art. By moving the pivot point 74 closer to the first end 68, the present armature 66 is provided with increased mechanical advantage, which provides additional force for the armature to the moving blade. This increased force allows the present pivot motor 54 to provide satisfactory cutting power despite the low operational voltage.

More specifically, as seen in FIG. 6, a ratio of a distance "A" of the pivot point 74 to the end 72 having the magnet 70 to said at least one magnet; to a distance "B" from the pivot point to the end 68 engaging the moving blade 18 (A:B) is 2.1:1. This compares to a similar ratio in the motor 28 of 1.3:1.

Another feature of the present pivot motor 54 is the use of a sensor 80 (FIG. 3) preferably located on the cover plate 62 but conceivably located on the clipper housing 14. In the preferred embodiment, the sensor 80 is an opto-sensor, however other sensors such as Hall effect sensors, are contemplated as are known in the art. The sensor 80 is provided for monitoring operational stroke of the armature 66. Also, the sensor 80 is electrically connected to a controller or microcontroller 82 associated with the pivot motor 54 for adjusting motor voltage as a function of the sensed armature stroke using Pulse Width Modulation.

In the preferred embodiment, the controller 82 is configured so that as a sensed armature stroke decreases, the motor voltage increases. This system is used to adjust and conserve motor resources, so that additional voltage is provided to the motor 54 when cutting load increases, as in the case of relatively dense or thick hair.

Figure 7:
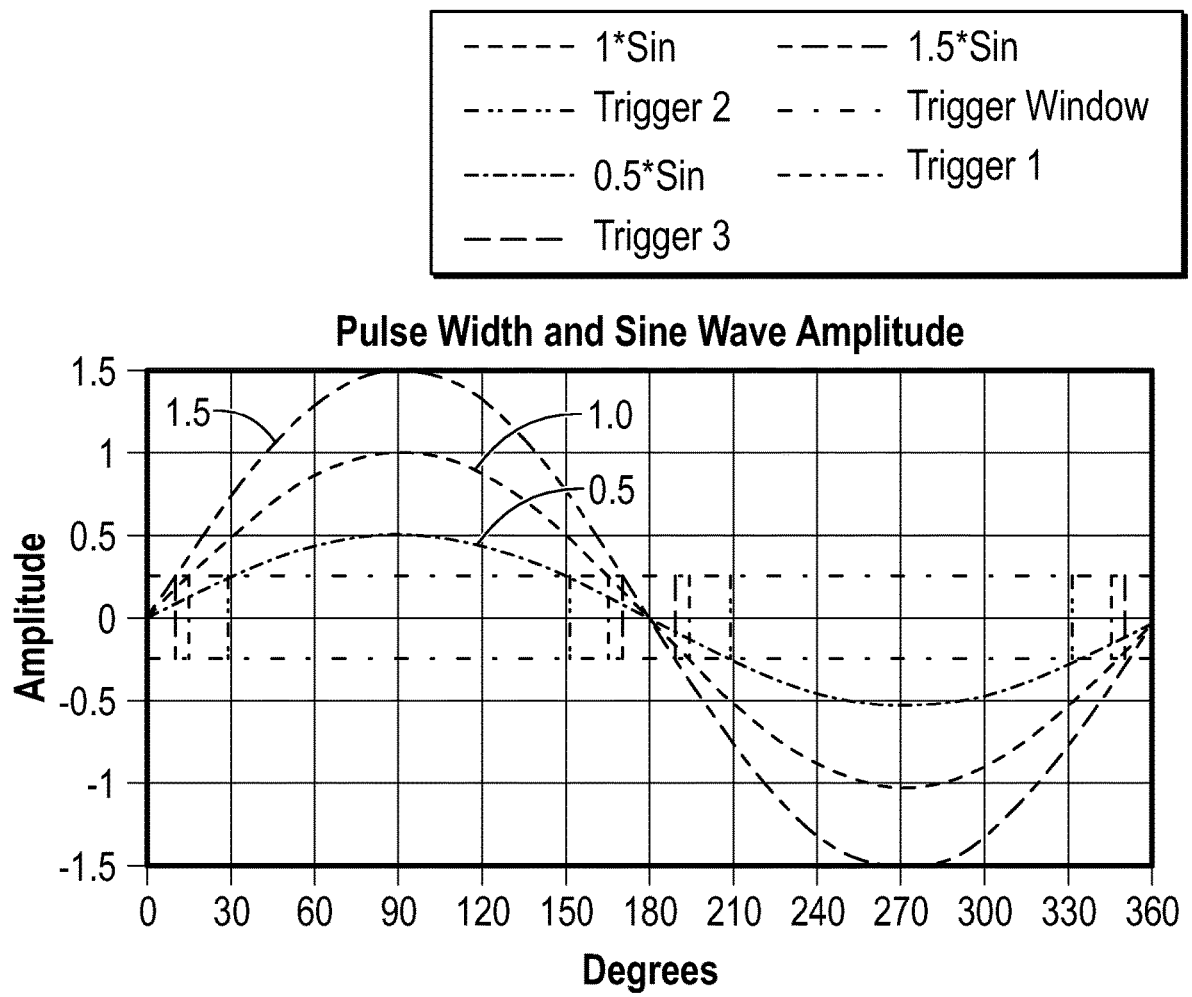
FIG. 7 is a graph of Sensed Pulse Width and Sine Wave Amplitude.
Figure 8:
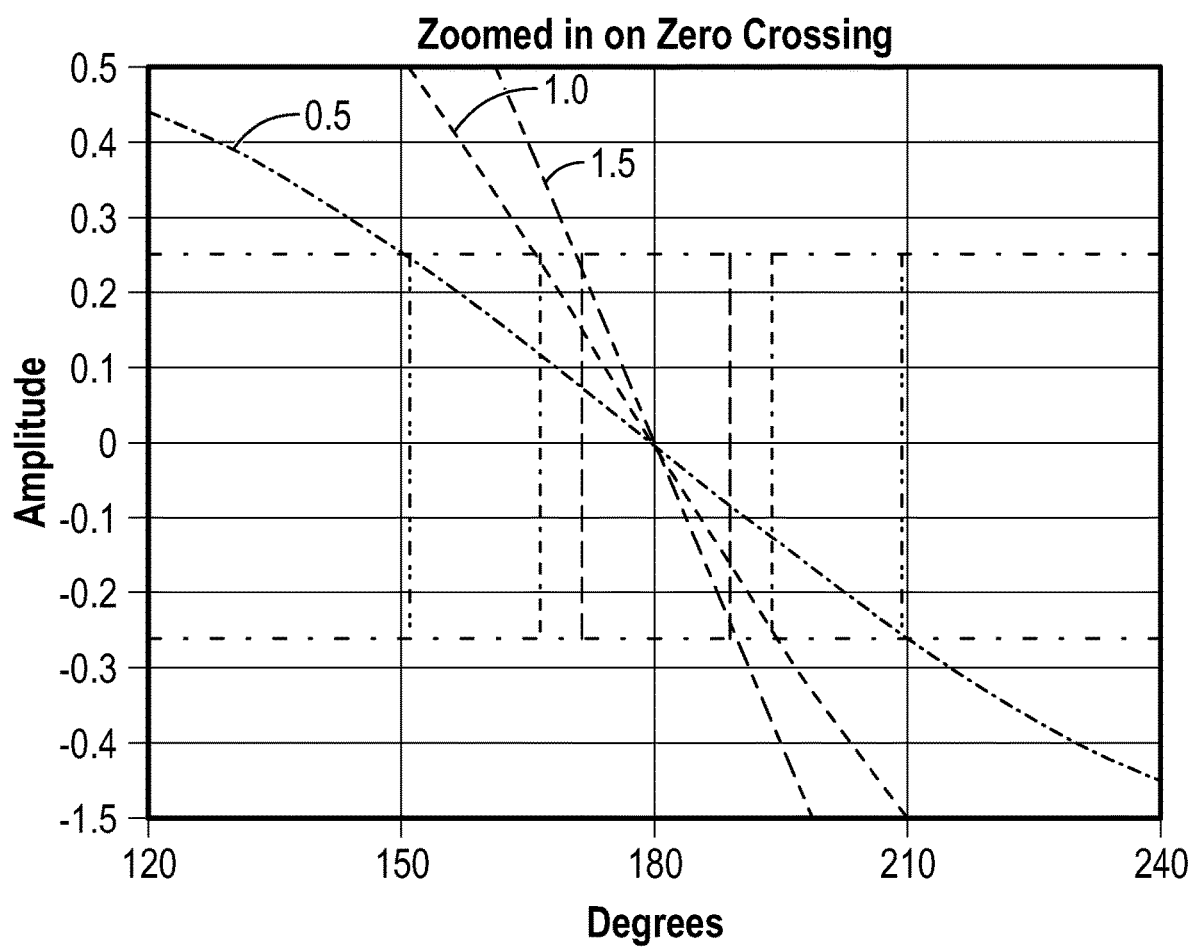
FIG. 8 is an enlarged graph of the relationship depicted in FIG. 7.

Referring now to FIGS. 7 and 8, graphs of a comparison of measured Pulse Width and Sine Wave Amplitude are shown. FIG. 7 shows 3 sine waves of equal frequency but different amplitudes, all normalized to 1, as well as a window defined by two amplitude threshold limits which are smaller than the smallest expected peaks of the sine wave. FIG. 8. is an enlarged fragment of the central portion of FIG. 7 highlighting the area where the sine waves pass through the threshold window. It can be seen from FIGS. 7 and 8 that the time it takes for an object to pass between two fixed amplitude levels is inversely proportional to the overall amplitude of the movement as illustrated. The timing of the movement of the armature 66 measured by the sensor 80 and is translated to amplitude through this relationship.

Referring again to FIGS. 4-6, another feature of the present motor 54 is that a support plate 86 to which the stator 56 is attached, and which provides the mounting point for the pivot point 74, is structurally stiffened to maintain a constant operational spacing between the end 72 of the armature 66 and the stator 60. As such, the support plate 86 is provided with an elongate, preferably centrally located strengthening channel 88. Further, the stator 56 is welded to the support plate 86 so that a weld bead 90 (FIG. 6) securing the stator in place, extends beyond an end of the channel 88.

For providing a return force to the armature 66 that resists the reciprocation generated by the stator 56 and the coil 60, at least one compression spring 92 is connected to the armature 66. In the preferred embodiment, four such springs 92 are provided, two on each side of the armature 66. For each spring 92, a free end 94 of the spring is secured in a vertically projecting bracket portion 96 of the support plate 86. Opposite ends 98 of each spring 92 are engaged in seats or sockets 99 on each side of the armature 66.

While a particular embodiment of the present hair clipper pivot motor designed for battery power has been described herein, it will be appreciated by those skilled in the art that changes and modifications may be made thereto without departing from the invention in its broader aspects and as set forth in the following claims.

The invention claimed is:

1. A hair clipper, comprising:
    a hair clipper housing;
    a hair clipper bladeset operatively associated with said housing and including a stationary blade and a moving blade configured for lateral reciprocation relative to said stationary blade;
    a pivot motor mounted in said hair clipper and electrically connected to a power source within said hair clipper housing, wherein said pivot motor includes:
        a stator with a plurality of laminations and having a length in the range of 23-27 mm and a width in the range of 28-35 mm;
        a bobbin located in operational relation to said stator and having a coil of wire wound around said bobbin, wherein said bobbin is provided with a coil of 26 Gauge or thicker wire;
        an armature being configured for driving said moving blade at a first end, and having at least one magnet at a second end, said armature having a pivot point; and
        said motor being configured for operation between 2.5 and 4.2 Volts.

2. The hair clipper of claim 1, wherein said armature is constructed and arranged so that said at least one magnet has a plurality of surfaces, and is encapsulated on all but one surface by said armature.

3. The hair clipper of claim 1, wherein said pivot point of said armature is located closer to the first end of said armature than to the second end, said second end accommodating said at least one magnet.

4. The hair clipper of claim 3, wherein a ratio of a distance of said pivot point to the second end of said armature accommodating said at least one magnet; to a distance from said pivot point to the first end of said armature is 2.1:1.

5. The hair clipper of claim 1, further including a sensor operationally associated with said motor, constructed and arranged for measuring an operational stroke of said armature, and configured for being electrically connected to a controller of said motor for adjusting motor voltage as a function of said sensed armature stroke using Pulse Width Modulation.

6. The hair clipper of claim 5, wherein said sensor is an opto-sensor.

7. The hair clipper of claim 5, wherein said controller is configured so that as said sensed armature stroke decreases, said motor voltage increases.

8. The hair clipper of claim 1, further including a support plate to which said stator is connected, said support plate also being a mounting point for said armature.

9. The hair clipper of claim 8, wherein said stator is connected to said support plate by welding.

10. The hair clipper of claim 1, wherein said wire used in said coil is 22 to 26 Gauge wire.

11. A hair clipper, comprising:
a hair clipper housing;
a hair clipper bladeset operatively associated with said housing and including a stationary blade and a moving blade configured for lateral reciprocation relative to said stationary blade;
a pivot motor mounted in said hair clipper and electrically connected to a power source within said hair clipper housing, wherein said pivot motor includes:
a stator with a plurality of laminations;
a bobbin located in operational relation to said stator and having a coil of wire wound around said bobbin, wherein said bobbin is provided with a coil of 26 Gauge or thicker wire;
an armature being configured for driving said moving blade at a first end, and having at least one magnet at a second end, said armature having a pivot point; and
said stator has length taken along a longitudinal axis of the hair clipper in the range of 23-27 mm and a width in the range of 28-35 mm.

12. The hair clipper of claim 11, wherein said bobbin is provided with a coil of 22 to 26 Gauge wire.

13. The hair clipper of claim 12, wherein said coil includes 75 turns of wire.

14. A hair clipper, comprising:
a hair clipper housing;
a hair clipper bladeset operatively associated with said housing and including a stationary blade and a moving blade configured for lateral reciprocation relative to said stationary blade;
a pivot motor mounted in said hair clipper and electrically connected to a power source within said hair clipper housing, wherein said pivot motor includes:
a stator with a plurality of laminations, wherein said stator has length taken along a longitudinal axis of the hair clipper in the range of 23-27 mm and a width in the range of 28-35 mm;
a bobbin located in operational relation to said stator and having a coil of wire wound around said bobbin;
an armature being configured for driving said moving blade at one end, and having at least one magnet at an opposite end, said armature having a pivot point;
a sensor associated with said clipper housing and constructed and arranged for measuring an operational stroke of said armature, and being electrically connected to a controller of said motor for adjusting motor voltage as a function of said sensed armature stroke using Pulse Width Modulation, said controller is configured so that as said sensed armature stroke decreases, said motor voltage increases.

15. The hair clipper of claim 14, wherein said bobbin is provided with a coil of 26 Gauge or thicker wire.

\* \* \* \* \*